US012331575B2

(12) United States Patent
Pertermann et al.

(10) Patent No.: US 12,331,575 B2
(45) Date of Patent: Jun. 17, 2025

(54) DIRECTION-DEPENDENT ACTIVATION OF THE DOOR OPERATION OF A DOMESTIC DISHWASHER

(71) Applicant: BSH Hausgeräte GmbH, Munich (DE)

(72) Inventors: Hans-Holger Pertermann, Dresden (DE); Aaron Friedke, Gundelfingen (DE); Martin Rittner, Welden (DE)

(73) Assignee: BSH Hausgeräte GmbH, Munich (DE)

( * ) Notice: Subject to any disclaimer, the term of this patent is extended or adjusted under 35 U.S.C. 154(b) by 328 days.

(21) Appl. No.: 17/924,127

(22) PCT Filed: May 25, 2021

(86) PCT No.: PCT/EP2021/063790
§ 371 (c)(1),
(2) Date: Nov. 9, 2022

(87) PCT Pub. No.: WO2021/244889
PCT Pub. Date: Dec. 9, 2021

(65) Prior Publication Data

US 2023/0184021 A1 Jun. 15, 2023

(30) Foreign Application Priority Data

Jun. 5, 2020 (DE) ......................... 102020207064.4

(51) Int. Cl.
*A47L 15/42* (2006.01)
*E05F 15/627* (2015.01)

(52) U.S. Cl.
CPC ........ *E05F 15/627* (2015.01); *A47L 15/4261* (2013.01); *A47L 15/4274* (2013.01);
(Continued)

(58) Field of Classification Search
CPC ........... E05F 15/627; E05Y 2400/3013; E05Y 2400/36; E05Y 2400/40; E05Y 2400/44;
(Continued)

(56) References Cited

U.S. PATENT DOCUMENTS

2015/0354261 A1 12/2015 Dora
2018/0055329 A1* 3/2018 Lehmann ............ A47L 15/4259
(Continued)

FOREIGN PATENT DOCUMENTS

EP 2950002 A1 12/2015
WO WO-2019076635 A1 * 4/2019 ......... A47L 15/4261

OTHER PUBLICATIONS

Machine Translation of Gerstner et al., WO-2019076635-A1, Apr. 2019. (Year: 2019).*
(Continued)

*Primary Examiner* — David G Cormier
(74) *Attorney, Agent, or Firm* — Michael E. Tschupp; Andre Pallapies; Brandon G. Braun

(57) ABSTRACT

A household dishwasher includes a washing container having a loading opening, a door, an electrical drive device configured to move the door between a closed position, in which the door closes the loading opening, and an open position, in which the washing container is accessible from outside, and a control unit configured to identify a manual movement of the door performed by an operator in a direction of movement by detecting a characteristic variable of the drive device and to move the door further in the direction of movement via the drive device as a result of the manual movement of the door by the operator.

14 Claims, 4 Drawing Sheets

(52) U.S. Cl.
CPC ....... *A47L 2301/08* (2013.01); *A47L 2401/26* (2013.01); *A47L 2501/22* (2013.01); *E05Y 2201/438* (2013.01); *E05Y 2201/654* (2013.01); *E05Y 2201/688* (2013.01); *E05Y 2400/3013* (2024.05); *E05Y 2400/36* (2013.01); *E05Y 2400/40* (2013.01); *E05Y 2400/44* (2013.01); *E05Y 2400/45* (2013.01); *E05Y 2900/304* (2013.01)

(58) Field of Classification Search
CPC ........... E05Y 2400/45; E05Y 2201/438; E05Y 2201/654; E05Y 2201/688; E05Y 2900/304; A47L 15/4257; A47L 15/4259; A47L 15/4261; A47L 15/4274; A47L 2301/08; A47L 2401/26; A47L 2501/22
See application file for complete search history.

(56) References Cited

U.S. PATENT DOCUMENTS

| | | | |
|---|---|---|---|
| 2020/0196828 | A1 | 6/2020 | Lehmann |
| 2020/0281438 | A1 | 9/2020 | Friedke |
| 2020/0284083 | A1 | 9/2020 | Köhler |

OTHER PUBLICATIONS

National Search Report DE102020207064.4 dated Feb. 16, 2021.
International Search Report PCT/EP2021/063790ndated Jul. 27, 2021.

* cited by examiner

DIRECTION-DEPENDENT ACTIVATION OF THE DOOR OPERATION OF A DOMESTIC DISHWASHER

CROSS-REFERENCES TO RELATED APPLICATIONS

This application is the U.S. National Stage of International Application No. PCT/EP2021/063790, filed May 25, 2021, which designated the United States and has been published as International Publication No. WO 2021/244889 A1 and which claims the priority of German Patent Application, Serial No. 10 2020 207 064.4, filed Jun. 5, 2020, pursuant to 35 U.S.C. 119 (a)-(d).

The contents of International Application No. PCT/EP2021/063790 and German Patent Application, Serial No. 10 2020 207 064.4 are incorporated herein by reference in their entireties as if fully set forth herein.

BACKGROUND OF THE INVENTION

The invention relates to a household dishwasher comprising a washing container which has a loading opening, wherein the loading opening can be closed by means of a door of the household dishwasher, wherein the household dishwasher comprises an electrical drive device, by means of which the door can be moved between a closed position, in which it closes the loading opening, and an open position, in which the washing container is accessible from outside.

A method for operating a household dishwasher comprising a washing container which has a loading opening is also proposed, wherein the loading opening can be closed by means of a door of the household dishwasher, wherein the household dishwasher comprises an electrical drive device, by means of which the door is moved between a closed position, in which it closes the loading opening, and an open position, in which the washing container is accessible from outside.

Household dishwashers are known in the prior art and in principle serve for cleaning and subsequently drying soiled washware, for example crockery or cutlery. During one or more cleaning steps, washing liquor (=water or water with detergent and/or rinse aid) is applied to the washware in order to release soiling from the washware. For drying the washware, corresponding household dishwashers have a drying system for the cleaned washware, in which air absorbs the water which adheres to the cleaned washware and as a result dries the washware.

In order to load the washware into the washing container or to remove the washware again from the washing container after the cleaning process, household dishwashers have a door which can be moved between an open position and a closed position, wherein naturally intermediate positions are also possible (partially open).

Hitherto it was known, in particular, to mount the door via a hinge, wherein the door can be manually opened and closed by an operator exclusively by mechanical action.

Household dishwashers which have an electrical drive motor also already exist, the door being able to be moved thereby to and fro between the open position and the closed position. Corresponding household dishwashers have, for example, a control element, for example a control knob, in order to activate the drive. If the control element is actuated by an operator, the drive is activated in order to move the door.

BRIEF SUMMARY OF THE INVENTION

It is the object of the present invention to develop further the known prior art.

The object is achieved by the features of the independent claims.

The household dishwasher according to the invention is characterized in that it has a control unit which is designed to identify a manual movement of the door performed by an operator in a specific direction of movement by detecting at least one characteristic variable of the drive device, and to move the door further in the aforementioned direction of movement by means of the drive device as a result of the movement.

The drive device is thus no longer activated by the manual actuation of a preferably specifically provided control element. Rather, it is provided that the household dishwasher automatically identifies a movement of the door performed manually by the operator and interprets the movement impulse of the door triggered by the operator as an output signal in order to shift the movement of the door further in the direction of movement in which it has been manually moved by the operator. Thus one or more characteristic variables of the drive device itself are used in order to detect the movement of the door by the operator. The background to this is that, by coupling the door to the drive device, a manual movement of the door also brings about a manual movement of the drive device or parts thereof. For example, it might be conceivable that one or more elements of the drive device, for example a mechanical connection which connects the door to an electrical drive motor of the drive device, are monitored continuously by means of a sensor as to whether a movement (for example a rotational movement or a pivoting movement) of the one or more elements of the drive device takes place without the drive device having been previously activated by the control unit. This is an indication that the door has been manually moved by the operator.

If it is identified by the control unit that a corresponding movement of the door has been performed by the operator, this is interpreted to the effect that the operator would like to continue this movement as far as a certain position of the door. In this case, the control unit activates the drive device in order to bring about this further movement of the door.

The door is thus moved further by means of the drive device when an initial movement impulse of the door, which has been caused by a manual movement of the door by the operator, is identified.

The door of the household dishwasher according to the invention is preferably a front door which can be pivoted open to the front and downwardly about a lower rotational axis running in the width direction (considered from the point of view of an operator who is standing in front of the household dishwasher for the operation thereof). In its closed position, this front door stands, in particular, substantially vertically upright. In this case, the door closes the front loading opening of the washing container of the household dishwasher. For the opening thereof, the door can be pivoted open to the front and downwardly about the lower horizontal axis. In the fully open position, the door is located, in particular, at least approximately horizontally.

According to an advantageous development, it is provided that the control unit is configured to move the door further by means of the drive device as a result of the movement by the operator until an end position is reached. In this case, the end position corresponds to the open position or the closed position of the door, as a function of the direction of movement of the manual movement performed by the operator. If the operator moves the door a little further in the direction of the open position, therefore, this is interpreted by the control unit as a sign that the operator would like to open the door fully. In this case, the door is moved further and sufficiently far that it adopts its open position (the open position is the position in which the door cannot be opened further). It is also conceivable that in the case where the door is moved by the operator manually in the direction of the closed position, this is perceived by the control unit that the operator would like to close the door fully (=closed position). After identifying a corresponding movement impulse, in this case the control unit activates the drive device until the door has adopted its closed position.

Preferably, therefore, the operator has to perform only a short movement of the door in the direction of the open position or in the direction of the closed position in order to provide thereby the sign to the control unit that he wishes to move the door into the corresponding end position (open position or closed position). The remaining movement is then performed by the drive device which is accordingly activated by the control unit.

The respective end position can be identified, for example, by one or more sensors. It is also conceivable that the control unit always knows the position in which the door is located, by evaluating one or more characteristic variables of the drive device. On the basis of this data, the control unit also ultimately knows how much further it has to move the door in order to reach the corresponding end position after a manual movement impulse is identified. A sensor which identifies the corresponding end position of the door is not necessary in this case.

According to an advantageous development, it is provided that the drive device comprises a permanently excited drive motor with a rotor which is mechanically coupled to the door, such that the movement of the door manually brought about by the operator brings about a movement of the rotor. Permanently excited drive motors have the property of generating an electromotive force in the winding (stator) when the rotor is rotated, whereby an electrical voltage which can be tapped at the motor terminals and evaluated by the control unit is induced in the drive motor. In this case, therefore, the non-activated drive motor acts as a generator when the door is manually moved.

When exerting a force on the door by a hand, knee or foot, the door will move a little and the rotor can rotate by a certain angular amount due to the frictional connection to the drive motor, whereby for a short time a voltage impulse is generated at the motor terminals. The polarity or phase sequence of the voltage is dependent on the direction of movement and the voltage level is proportional to the angular speed of the door.

In this case, the control unit is configured to detect the electrical voltage as a characteristic variable of the drive device (the electrical voltage corresponds in this case to the above-mentioned characteristic variable). Moreover, the control unit is configured, when detecting the electrical voltage, to operate the drive motor such that the door is moved further in the aforementioned direction of movement. The advantage, in particular, is that additional sensors which would identify a movement of the door or the drive motor are not required. Rather, by the aforementioned generator operation when the door is moved manually, the drive motor itself provides a characteristic variable which can be identified or evaluated by the control unit.

Thus by evaluating the induced electrical voltage without an additional complex sensor system, the desire to activate the door and also the intended direction of the door activation can be identified by the control unit and the drive device can be activated in order to move the door further in the direction of movement which has been predetermined by the operator by manual movement of the door.

If the door is moved manually by the operator, therefore, an electrical voltage is induced in the drive motor, wherein the control unit is configured to detect the electrical voltage as a characteristic variable of the drive device and wherein the control unit is configured, when detecting the electrical voltage, to operate the drive motor such that the door is moved further in the aforementioned direction of movement.

A further characteristic variable which could be monitored additionally or alternatively by the control unit is, for example, the rotation of the rotor which could be monitored by means of a sensor.

According to an advantageous development, it is provided that the control unit is configured to evaluate the polarity (with a direct current motor or alternating current motor) or phase sequence (with a three-phase motor) of the electrical voltage, which is induced when the rotor is moved with the movement of the door manually brought about by the operator. In this case, the polarity of the electrical voltage means the signs (+ or −) thereof, whilst the phase sequence is understood to mean the chronological sequence of energizing three electrical phases of the three-phase current applied to the drive motor or the generator voltage which has been generated. The control unit is also configured to operate the drive motor by taking into consideration the polarity or phase sequence. Since the polarity or phase sequence depends on whether the operator manually moves the door in the direction of the open position or in the direction of the closed position, it can be identified by the control unit from the polarity or the phase sequence whether the operator would like to open or close the door.

In particular, it is provided that, after identifying an induced voltage on the drive motor, the control unit drives the drive motor in a direction (clockwise or anti-clockwise rotation of the rotor) which causes the door to be moved by means of the drive device in the direction of movement which corresponds to the direction of movement of the manual movement of the door previously carried out. The control unit thus causes the door to be moved in the same direction of movement after a manual movement impulse.

According to an advantageous development, it is provided that the control unit is configured to evaluate the amount and/or the frequency of the electrical voltage which is induced when the rotor is moved with the movement of the door manually brought about by the operator, wherein the control unit is also configured to operate the drive motor by taking into consideration the amount and/or the frequency of the induced electrical voltage. For example, it might be conceivable that the control unit selects the drive speed of the drive motor and thus the movement speed of the door produced by the drive motor as a function of the aforementioned amount and/or the frequency of the induced electrical voltage. If the door is manually moved by the operator in a rapid manner, therefore, the door is also moved further by the drive motor in a relatively rapid manner. If, however, the door is moved relatively slowly by the operator, the movement is also carried out relatively slowly by the drive motor. In order to be able to fix correspondingly the drive speed of the drive motor, limit values or ranges for the detected amount and/or the frequency of the induced electrical voltage can be stored in the control unit, wherein a specific drive speed of the drive motor is selected according to the detected amount.

Additionally or alternatively, it is also conceivable that the control unit is configured to evaluate the amount of the angle of rotation of the rotor with the aforementioned movement of the door which is manually brought about, wherein the control unit is also configured to operate the drive motor by taking into consideration the amount of the angle of rotation. By evaluating the angle of rotation, the control unit is able to identify the current position of the door or the position after manual movement by the operator. If the door has, for example, a maximum opening angle of 90° and it is detected by the control unit that starting from the closed position the door has moved by 10°, the control unit knows that it has to move the door according to the manual movement impulse of the operator by a further 80° in order to transfer the door into its open position. In this case, the opening angle of the door can be calculated from the angle of rotation of the rotor since this rotor is mechanically coupled to the door. A specific angle of rotation of the rotor thus always corresponds to a specific opening angle of the door.

According to an advantageous development, it is provided that the drive motor is mechanically coupled to the door via a gear mechanism, such that a rotation of the rotor of the electrical drive motor brings about a movement of the door or a movement of the door brings about a rotation of the rotor. The use of a gear mechanism has the advantage that a rotational speed and the torque of the drive motor can be converted such that the rotational movements of the rotor can be optimally adapted to the requirements of a door opening mechanism. Preferably, a reduction gear is provided in which the gear ratio of the drive speed of the rotor of the electrical drive motor to the output speed of the output shaft of the gear mechanism is greater than 1. The output shaft in this case is preferably connected fixedly in terms of rotation to a rotatably mounted roller, a drive cable bearing against the outer circumference thereof at least in some portions and said drive cable being coupled to the door for the movement thereof. The roller is attached, for example, to a side wall of a bottom support which is arranged below the washing container and serves for receiving functional components such as for example a circulating pump, emptying pump, program control unit, decalcification system, etc. The drive motor can be kept sufficiently compact by the reduction gear, which simplifies the accommodation thereof, in particular, in the bottom support below the washing container of the household dishwasher. At the same time, a sufficiently large torque can be generated on the roller and the drive cable for moving the door. The gear mechanism can be, for example, a planetary gear, a spur gear or a belt gear. It can be advantageous, however, in particular if a drive connection between the door and the drive motor is cable-free and/or belt-free. Preferably, the drive connection between the door and the drive motor is implemented exclusively by means of fixed bodies (i.e. no drive cables or belts). Advantageously, a torque of the drive motor can be transmitted to the door in a reliable manner with low vibrations.

According to an advantageous development, it is provided that the gear mechanism is not configured to be self-locking. This has the advantage that the door can be moved manually by the operator even when the drive motor is deactivated. The gear mechanism thus does not cause a blocking of the door when the drive motor is deactivated. A rotation of the output shaft of this non-self-locking gear mechanism by manual movement of the door is thus possible when the electrical drive motor is de-energized.

According to an advantageous development, it is provided that the drive motor is coupled to the door via a drive cable, such that a rotation of the rotor brings about a movement of the door or a movement of the door brings about a rotation of the rotor. The drive motor is thus not connected to the door or at least not exclusively by means of fixed body gear parts. Rather, at least one part of the drive train between the drive motor or the rotor thereof and the door is implemented by a drive cable.

According to an advantageous development, it is provided that the drive cable is in contact with a rotatably mounted roller of the household dishwasher, in particular is wound around said roller, and that the drive motor is configured to drive the roller for moving the drive cable, such that the door is moved in the form of a pivoting movement by operating the drive motor. Since the drive cable, which is connected to the door, is directly moved by a driven roller, a particularly space-saving arrangement can be provided. For example, the movement of the door can be directly influenced by means of the driven roller. Moreover, a household dishwasher can be provided in which an automatic door movement can be implemented with a small number of components. "Roller" means in the present case, for example, a rotatably mounted element which has, in particular, a rotational symmetry relative to a central axis. The roller can also be denoted, for example, as a drive cable roller. In this case, a drive cable is in contact with the roller along an angle of wrap, wherein for example during a movement of the drive cable the angle of wrap remains, in particular, substantially constant. In other words, for example, an amount of a contact surface between the drive cable and the roller remains constant. Preferably, the drive cable comprises plastics or metal. Alternatively or additionally, the drive cable can comprise yarn or textiles, in particular natural fibers and/or synthetic fibers. For example, the drive cable is formed from a plurality of drive cable portions which are mechanically connected together. For example, the drive cable is not fixedly connected to the roller but is merely in abutment with the roller. The roller functions as a direct drive of the drive cable. For example, the drive cable is driven only by means of the roller.

According to an advantageous development, it is provided that the roller and the drive cable are configured such that a drive force is transmitted from the roller to the drive cable exclusively by means of frictional locking. Preferably, the drive force is transmitted from the roller to the drive cable by means of drive cable friction. Due to the generated drive cable force, for example, a tangential static friction force develops in contact with a roller circumference which is used for producing the door movement. Advantageously, a tensile force on the door, which is brought about by the drive cable, can be limited thereby, since after a threshold tensile force is exceeded, sliding friction is produced on a contact surface between the drive cable and the roller. This has the advantage that a safety device can be provided. This makes it possible to prevent body parts which are trapped between the door and the housing from being crushed. Moreover, damage to objects with which the door collides can be avoided.

In particular, the door has a lever to which an end of the drive cable is connected, wherein the door, the drive motor and the drive cable are designed such that changing a tensile force on the lever by means of the drive motor and the drive cable brings about the pivoting movement of the door.

Preferably, the household dishwasher has a spring element which is connected to the housing and to the drive cable and which is designed to compensate at least partially for a weight force of the door. This has the advantage that the door can be prevented from dropping in an uncontrolled manner. Moreover, a manual closing of the door is facilitated. The spring element is preferably a helical spring. For example, a spring characteristic curve of the spring element is progressive, degressive or linear. For example, when an opening angle of the door is increased, the spring element is lengthened and pretensioned thereby. Preferably, the spring element is configured as a tension spring. Preferably, the drive cable is provided between the roller and the lever and between the roller and the spring element as a continuous drive cable. It is also conceivable that the drive cable and the roller are designed such that when an opening angle of the door is changed due to a manual force acting on the door, the drive cable slips over the roller.

The method according to the invention is characterized in that a manual movement of the door, performed by an operator in a specific direction of movement, is identified by means of a control unit of the household dishwasher by a characteristic variable of the drive device being detected, wherein the door is moved further in the aforementioned direction of movement by means of the drive device as a result of the movement. The operator thus does not have to move the door fully into the desired end position. Rather, it is sufficient that by a manual movement of the door the operator generates a certain movement impulse which is identified by a control unit of the household dishwasher. After identifying the movement impulse, the control unit activates the drive device of the household dishwasher such that the door is moved further in the direction of movement predetermined by the operator. The majority of the door movement in this case is undertaken by the drive device, wherein the initial movement of the door by the operator serves merely as start signal for the movement.

According to an advantageous development, it is provided that the drive device comprises a permanently excited drive motor with a rotor which is mechanically coupled to the door, such that the movement of the door manually brought about by the operator brings about a movement of the rotor, whereby an electrical voltage is induced in the drive motor, wherein the control unit detects the electrical voltage as a characteristic variable of the drive device and wherein, when the electrical voltage is detected, the control unit operates the drive motor such that the door is moved further in the aforementioned direction of movement. Regarding further features of the aforementioned drive motor, reference is made to the above description. The advantage of such a drive motor is that a movement of the rotor is identified as soon as the door is moved, since the rotor is operatively connected to the door. If a movement of the rotor is identified when the drive motor is actually deactivated, the control unit perceives this as a signal that the operator wishes to move the door. Separate sensors which identify a movement of the door, such as for example a proximity sensor, can be dispensed with here.

According to an advantageous development, it is provided that the amount and/or the frequency of the electrical voltage which is induced when the rotor is moved with the movement of the door manually brought about by the operator, and/or the amount of the angle of rotation of the rotor with the aforementioned movement of the door which is manually brought about, is evaluated by the control unit and the drive motor is operated by taking into consideration the amount and/or the frequency of the electrical voltage and/or the amount of the angle of rotation. For example, it would be conceivable to correlate the movement of the door brought about by the drive motor with the induced electrical voltage when the door is moved manually. A high induced electrical voltage is thus synonymous with a relatively large door movement by the drive motor in comparison with a lower induced electrical voltage. Alternatively or additionally, the amount of the angle of rotation can be used in order to establish how much further the door is moved after the detection of the movement impulse brought about by the operator.

According to an advantageous development, it is provided that the polarity or phase sequence of the electrical voltage, which is induced when the rotor is moved with the movement of the door manually brought about by the operator, is evaluated by the control unit, wherein the drive motor is operated by taking into consideration the polarity or phase sequence. In particular, by evaluating the polarity or the phase sequence of the electrical voltage, it can be identified in which direction the door is moved by the operator. The subsequent direction of movement by the drive motor ultimately corresponds to the direction of movement in which the door has been moved by the operator.

BRIEF DESCRIPTION OF THE DRAWINGS

The invention and its advantageous embodiments and developments and the advantages thereof are described hereinafter in more detail with reference to the drawings. In the drawings, in each case in a schematic basic sketch.

DETAILED DESCRIPTION OF EXEMPLARY EMBODIMENTS OF THE PRESENT INVENTION

Figure 1:
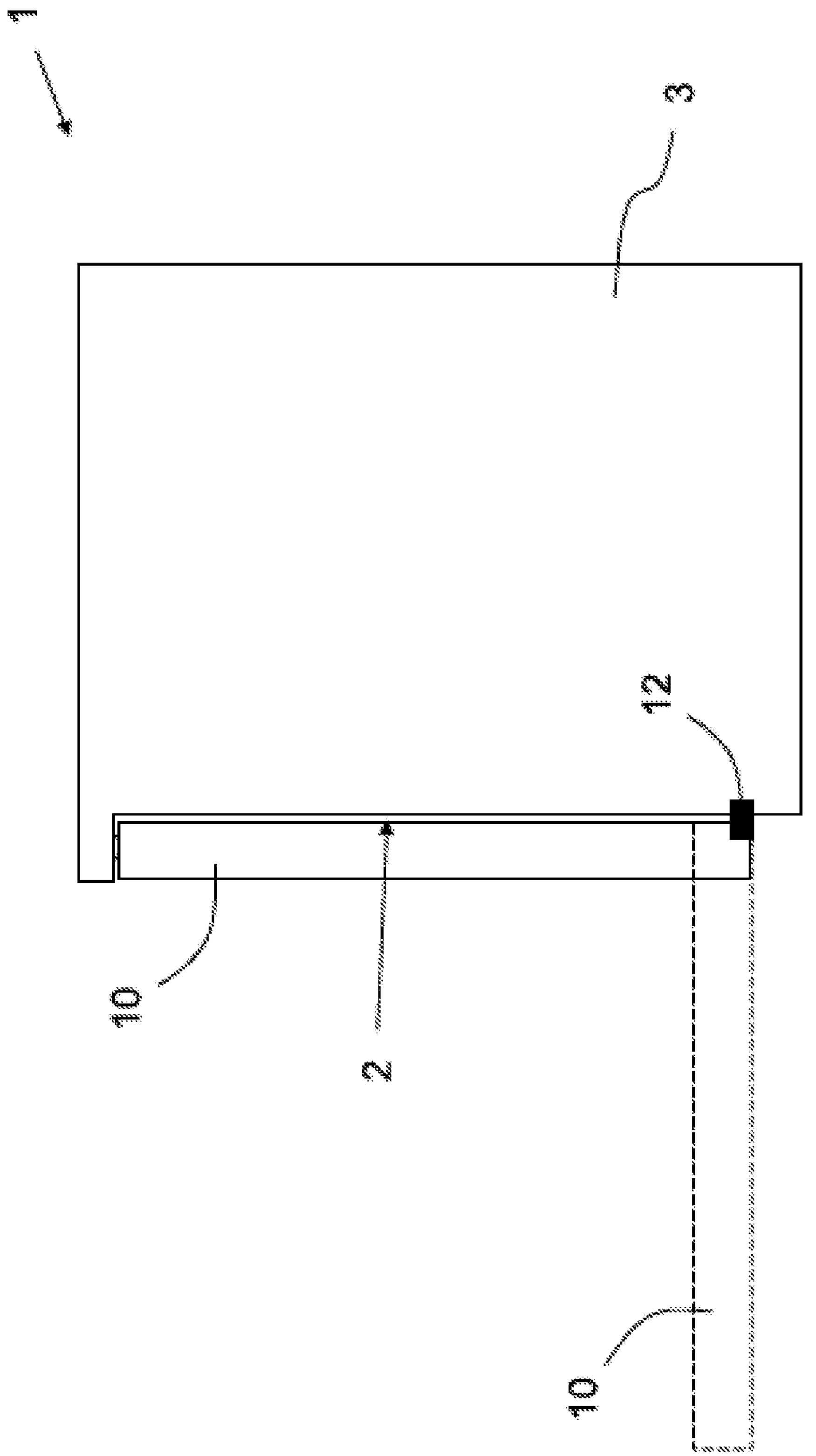
FIG. 1 shows a side view of a household dishwasher.

Elements which are the same or functionally the same have been shown in the figures with the same reference numerals, unless specified otherwise.

FIG. 1 shows a schematic side view of a household dishwasher 1. The household dishwasher 1 comprises a washing container 3 which can be closed by a door 10 in a watertight manner. The washing container 3 is preferably cuboidal. The washing container 3 and the door 10 form an internal washing chamber for washing washware.

The door 10 is shown in FIG. 1 by solid lines in its closed position in which it closes the washing chamber toward the outside. The door 10 is also shown by dashed lines in its open position, wherein in the open position the washing chamber is accessible to an operator via a loading opening 2, in order to place washware in the household dishwasher 1 or to remove washware therefrom. The door 10 can thus be closed or opened by pivoting about a pivot axis 11 provided at a lower end of the door 10.

The household dishwasher 1 also has at least one washware receptacle, not shown. Preferably, a plurality of washware receptacles, for example three thereof, can be provided, for example a lower washware receptacle or a lower basket, an upper washware receptacle or an upper basket or a cutlery drawer.

Figure 2:
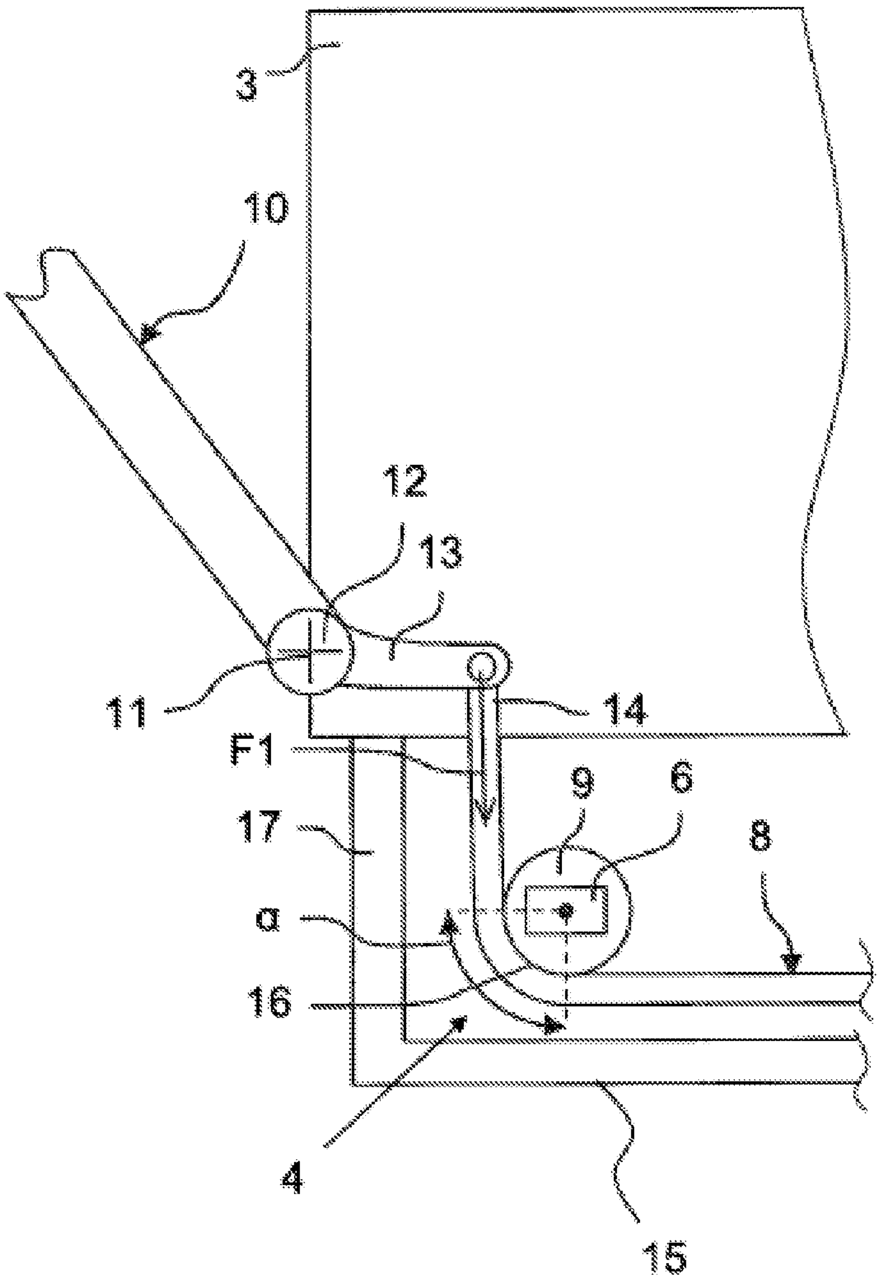
FIG. 2 shows a partial sectional side view of a detail of a household dishwasher according to the invention.
Figure 3:
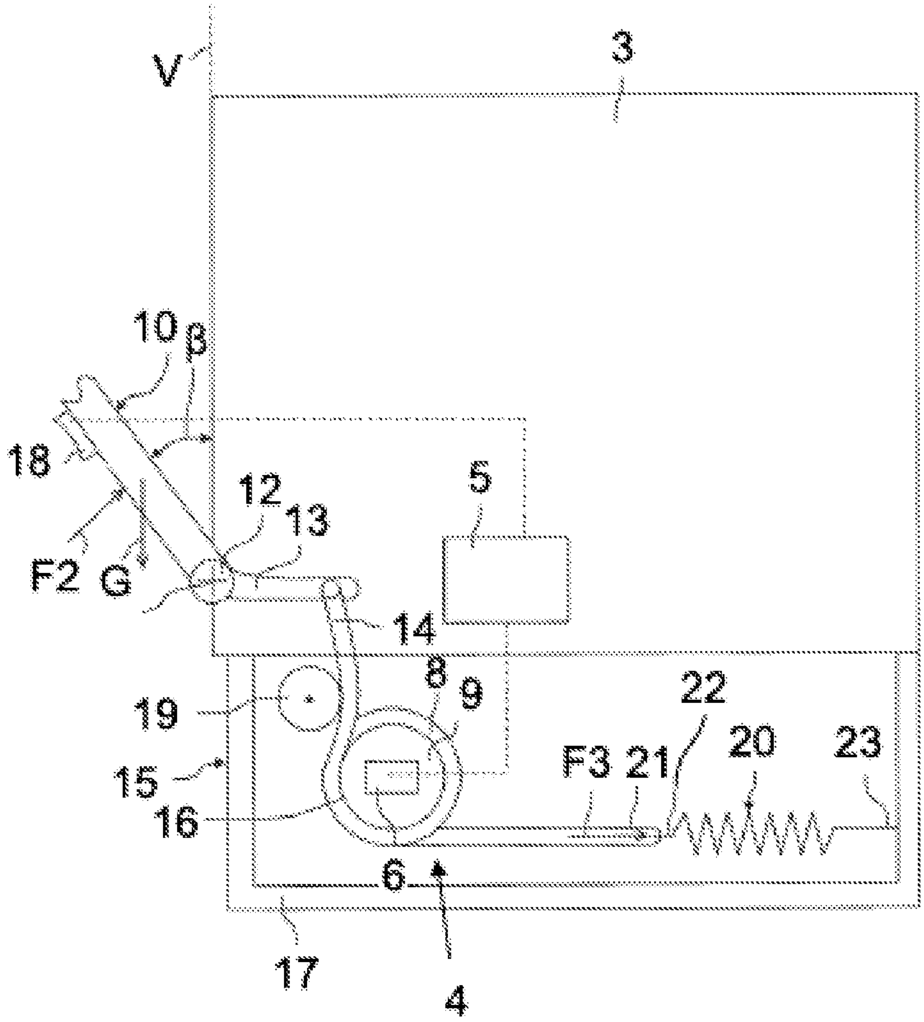
FIG. 3 shows a partial sectional side view of a household dishwasher according to the invention.
Figure 4:
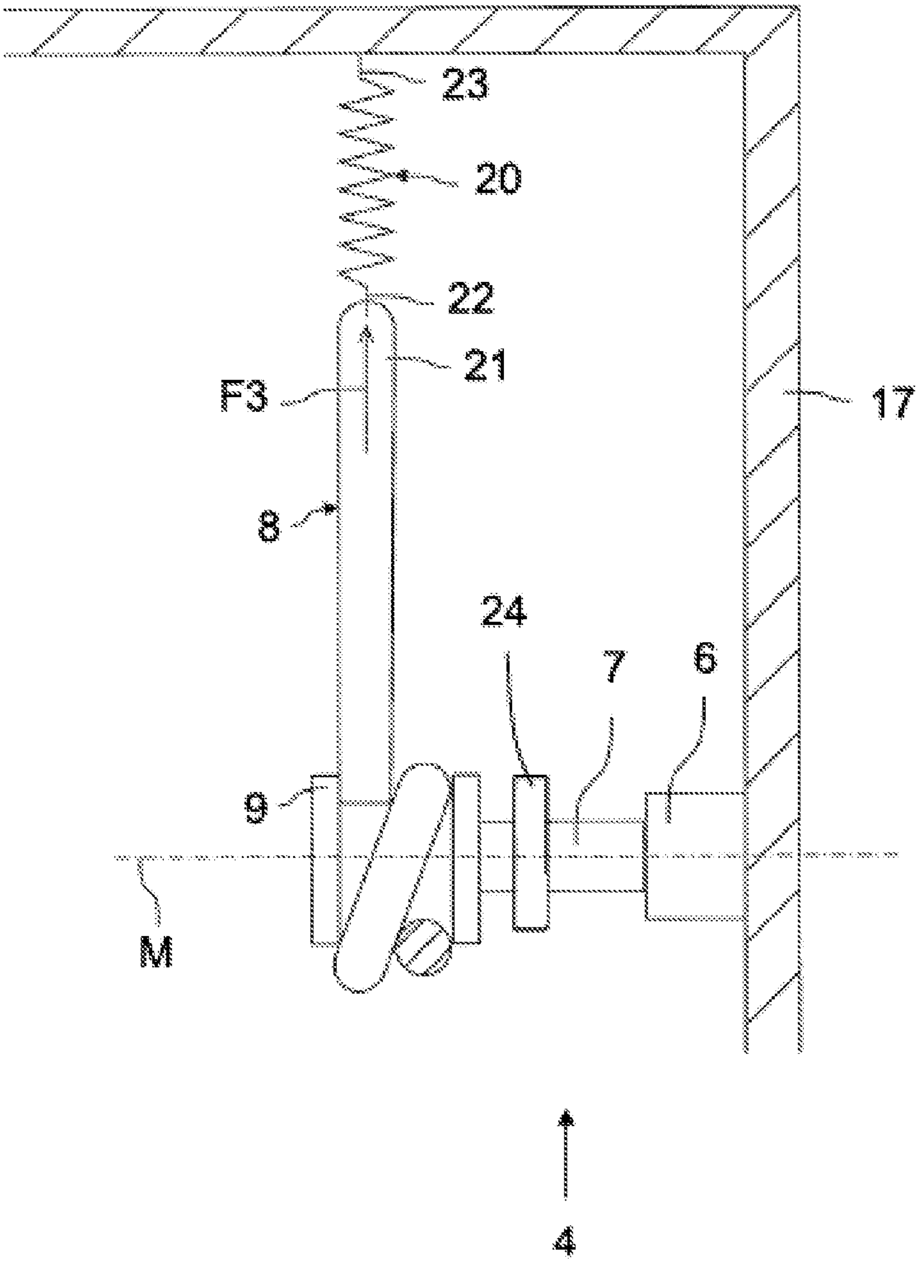
FIG. 4 shows a plan view of a detail of a household dishwasher according to the invention.

A bottom housing 17 which is shown in FIGS. 2 to 4 is arranged below the washing container. The washing container 3 is preferably fixedly connected to the bottom housing 17. For example, the bottom housing 17 and the washing container 3 form a housing 15 of the household dishwasher 1. The housing 15 comprises, for example, further housing portions (not identified by reference numerals) which surround and cover the washing container 3.

FIG. 2 shows a schematic detail of the side view of a household dishwasher 1 with further details. In this case, the household dishwasher 1 comprises the housing 15, the door 10 which is pivotably connected to the housing 15, a drive cable 8 which is connected to the door 10, a roller 9 which is in contact with the drive cable 8, and an electrical drive motor 6 which is designed to drive the roller 9 for moving the drive cable 8 such that a pivoting movement of the door 10 is brought about.

Moreover, the door 10 comprises a lever 13 to which a first end of the drive cable 8 is connected. The door 10, the drive motor 6 and the drive cable 8 are designed such that a change in a tensile force F1 on the lever 13 by means of the drive motor 6 and the drive cable 8 brings about the pivoting movement of the door 10. To this end, the roller 9 is connected in terms of drive to the drive motor 6.

The door 10 is connected, for example, by means of a hinge 12 to the housing 15. In this case, the pivot axis 11 runs through the hinge 12. Moreover, the door 10 comprises a plate-shaped door portion which covers or closes the loading opening 2 when the door 10 is closed (see FIG. 1).

The roller 9 and the drive cable 8 are preferably designed such that a drive force is transmitted from the roller 9 to the drive cable 8 exclusively by means of frictional locking. To this end, a friction surface 16 is formed between the roller 9 and the drive cable 8. The frictional locking is implemented, for example, by means of cable friction. In this case, the drive cable 8 is wound around the roller 9 along a circumferential angle which can be denoted as an angle of wrap $\alpha$. For example, the angle of wrap $\alpha$ is between 90° and 540°. In this case, the angle of wrap $\alpha$ is substantially constant when the drive cable 8 is moved by means of the roller 9.

FIG. 3 shows in a schematic side view a further embodiment of the household dishwasher 1 which further develops the embodiment shown in FIG. 2. In contrast to FIG. 2 the drive cable 8 has an angle of wrap $\alpha$ around the roller 9 of between 360° and 540°, preferably between 400° and 500°, more preferably between 425° and 475° and even more preferably between 445° and 455°. For example, the angle of wrap $\alpha$ is exactly 450°. This can also be denoted as 1.25 cable windings around the roller 9. Advantageously, a maximum tensile force which pulls on the lever 13 can be set or limited by such an angle of wrap $\alpha$.

Moreover, the household dishwasher 1 comprises a spring element 20 which is connected to the housing 15 and the drive cable 8 and which is designed to compensate at least partially for a weight force G of the door 10. In this case, a second end 21 of the drive cable 8 is connected to the spring element 20. For example, the spring element 20 is configured as a helical spring and a tension spring. The spring element 20 comprises a first end 22 which is connected to the second end 21 of the drive cable 8. Moreover, the spring element 20 comprises a second end 23 which is fixedly connected to the bottom housing 17. If the drive motor 6 now drives the roller 9 such that the door 10 performs an opening movement, then the spring element 20 is lengthened.

Moreover, the household dishwasher 1 comprises a deflection roller 19 which is designed to deflect the drive cable 8 between the roller 9 and the door 10. For example, the path of the drive cable 8 (cable path) can be designed by means of the deflection roller 19. For example, by the use of the deflection roller 19 the wrap angle $\alpha$ can be increased or adapted to the geometric boundary conditions of the housing 15.

Moreover, the drive cable 8 and the roller 9 are designed such that, with a change in an opening angle $\beta$ of the door 10 by a manual force F2 acting on the door 10, the drive cable 8 slips over the roller 9. This takes place, in particular, when the spring element 20 is abruptly relaxed, in particular with a rapid closure of the door 10 by means of the manual force F2, and a spring force F3 pulls on the second end 21 of the drive cable 8 when the roller 9 is blocked. In this case, the opening angle $\beta$ is an angle which is spanned between the door 10 and a vertical plane V through which the pivot axis 11 runs. The household dishwasher 1 is designed, for example, such that a cooperation of the spring force F3 and the weight force G of the door 10 with each opening angle $\beta$ of the door 10 permits a slip-free winding of the drive cable 8 onto the roller 9 and unwinding of the drive cable 8 from the roller 9.

Moreover, the household dishwasher 1 comprises a control unit 5 which is designed to control the drive motor 6 such that the pivoting movement of the door 10 is brought about. For example, the control unit 5 is designed to control the drive motor 6 such that the door 10 performs a full opening movement and/or a partial opening movement and/or a full closing movement and/or a partial closing movement. To this end, the control unit 5 and the drive motor 6 are coupled together in terms of signal technology (indicated in dashed lines). For example, the household dishwasher 1 comprises a user interface 18 which is designed to communicate with the control unit 5 for controlling the drive motor 6. Preferably, the user interface 18 comprises a push button, a touch display, a microphone, a sensor or another input device.

The roller 9 and/or the drive cable 8 and/or the spring element 20 and/or the drive motor 6 and/or the lever 13 can, for example, be provided redundantly and be arranged, for example, along the side walls of the household dishwasher 1.

FIG. 4 shows a detail of a section through the bottom housing 17 in a plan view. The drive motor 6 is preferably connected in terms of drive to the roller 9 by means of the rotor 7 of the drive motor 6 (this comprises a rotor 7 and a stator).

The drive motor 6 or the rotor thereof 7 can be operatively connected directly to the roller 9, or even via a gear mechanism 24, in particular a worm gear.

The roller 9 is rotated by means of the drive motor 6 and the gear mechanism 24 about a central axis M. The roller 9 has a rotational symmetry, for example, relative to the central axis M. For example, the gear mechanism 24 is designed to lock the movement of the roller 9 when a torque is applied to the roller 9 from outside the gear mechanism 24. This case can occur, for example, when an operator manually opens the door 10 such that the spring force F3 pulls at the second end of the drive cable 8 and thereby applies a torque onto the roller 9. If, for example, such a spring force F3 exceeds a predetermined amount, then the drive cable 8 slips over the roller 9. Then a sliding friction is produced on the friction surface 16.

According to the present invention, it is thus provided that irrespective of the precise design of the drive device 4 one or more characteristic variables of the drive motor 6 are identified and evaluated during a movement of the door 10 performed manually by the operator. If a manual movement of the door 10 is identified, the control unit 5 ultimately operates the drive motor of the drive device 4 such that the initial manual movement of the door 10 is continued. Preferably, the door 10 is moved further and sufficiently far until a defined end position (preferably the open position or the closed position of the door 10) is reached.

If the door 10 is now manually moved by the operator, the rotor 7 of the drive motor 6 is also moved since the door 10 is mechanically coupled to the rotor 7. By the movement of the rotor 7, an electrical voltage is induced in the drive motor 6 which can be evaluated by the control unit 5. A detected electrical voltage on the drive motor 6, which is actually deactivated, means that the door 10 has been manually moved by the operator. This is perceived by the control unit 5 to the effect that the operator might wish to open or close the door 10. After or even during the movement impulse brought about by the operator, the drive motor 6 is finally activated, wherein the door 10 is moved further in the same direction of movement as it was moved by the operator.

In the household dishwasher 1 according to the invention, therefore, a control element via which a movement of the door 10 is activated by the drive motor 6 is preferably not present. Rather, the drive motor 6 is indirectly activated by the manual movement of the door 10.

In order to regulate or control the movement speed or the opening angle of the door 10, it is advantageous during the movement by the drive motor 6 if the control unit 5 identifies and evaluates an electrical voltage which is induced in the drive motor 6 when the door 10 is moved manually by the operator.

Finally, details might be discussed again of several possible aspects in connection with the present invention, wherein the following points can be considered individually or in any combination.

A household dishwashing machine (another term for a household dishwasher) generally has a movable door, in particular a front door, which can be opened or closed manually via hinges, preferably at any angle from 0° to a maximum of 90° from the perpendicular to horizontal, for loading and unloading the crockery, wherein the door weight is compensated by a spring mechanism and a friction element prevents an automatic movement of the door such that any stable intermediate positions are possible.

A mechatronic drive system, denoted below as CADOC, consisting of cable drive, gear mechanism, electrical motor, control electronics and sensor system, can undertake in future the door movement which was previously manually carried out and thereby enhance the ease of use of the appliance and improve the ergonomics. The identification of the intention of the operator that he wishes to open or close the door and correspondingly activate the door drive is advantageous here.

Preferably, in the context of the invention a permanently excited electrical motor (DC or PMSM) can be used in the mechatronic drive train. This drive motor can be connected by means of suitable gear elements to the door hinge and the door leaf via a mechanical flow of force.

Permanently excited drive motors have the property of generating an electromotive force (EMF voltage/back-EMF) in the winding when the rotor is rotated, said electromotive force being able to be tapped at the motor terminals. In this case, the non-activated drive motor acts as a generator.

When exerting a force on the door by a hand, knee or foot, the door will move a little and the rotor can rotate by a certain angular amount due to the frictional connection to the drive motor, whereby for a short time a voltage impulse is generated at the motor terminals. The polarity or phase sequence of the voltage is dependent on the direction of movement and the voltage level is proportional to the angular speed of the door.

Thus by evaluating this signal without an additional complex sensor system, both the desire to activate the door and the intended direction of the door activation can be identified by the electronics and the corresponding direction of the door movement activated.

With a speed-controlled drive, the door speed can be set in a variable manner via the angular speed as a reaction to the impulse of the intended movement.

It is advantageous for the proposed solution if the interposed gear mechanism is not self-locking in the entire flow of force.

The described solution has the following advantages, amongst other things:

- convenient activation of the door opening or closing function without additional complex structural elements and cabling,
- no wear or ageing to be anticipated,
- no sensor system in the region prone to moisture,
- cost reduction of the entire CADOC system.

A mechatronic drive consisting of a permanently excited drive motor with a gear unit for opening and closing the door of a household dishwashing machine is thus conceivable, wherein the drive is activated by externally pushing the door, wherein by the mechanical coupling of the door to the drive motor a generator voltage is induced therein by rotating the rotor, which is used as an activation signal for the door drive.

In particular, an evaluation of the voltage direction and/or the phase sequence of the generator voltages induced in the motor windings is conceivable in order to identify the desired direction of movement of the door and correspondingly to activate the door in this direction.

The voltage level of the generator voltages induced in the motor windings can also be evaluated for influencing the speed of the door movement.

Moreover, the invention is not limited to the exemplary embodiment shown. Rather, all combinations of the described individual features are as shown or described in the claims, the description and the figures, and if a corresponding combination appears technically possible or expedient, form the subject matter of the invention.

The invention claimed is:

1. A household dishwasher, comprising:

a washing container having a loading opening;

a door;

an electrical drive device configured to move the door between a closed position, in which the door closes the loading opening, and an open position, in which the washing container is accessible from outside, the electrical drive device comprising:

a permanently excited drive motor including a rotor that is mechanically coupled to the door and configured to cause a movement of the rotor in response to a manual movement of the door by an operator, thereby inducing an electrical voltage in the drive motor; and a control unit configured to identify the manual movement of the door performed by the operator in a direction of movement by detecting a characteristic variable of the electrical drive device and to move the door further in the direction of movement via the drive device as a result of the manual movement of the door by the operator, the control unit further configured to detect the electrical voltage as the characteristic variable of the electrical drive device and, upon detection of the electrical voltage, to operate the drive motor such that the door is moved further in the direction of movement.

2. The household dishwasher of claim 1, wherein the control unit is configured to move the door via the drive device as a result of the manual movement of the door by the operator until reaching an end position which corresponds to the open position or the closed position of the door as a function of the direction of movement of the manual movement performed by the operator.

3. The household dishwasher of claim 1, wherein the control unit is configured to evaluate a polarity or phase sequence of the electrical voltage, said control unit configured to operate the drive motor by taking into consideration the polarity or phase sequence.

4. The household dishwasher of claim 1, wherein the control unit is configured to evaluate an amount and/or a frequency of the electrical voltage, and/or an amount of an angle of rotation of the rotor, said control unit configured to operate the drive motor by taking into consideration the amount and/or the frequency of the electrical voltage and/or the amount of the angle of rotation of the rotor.

5. The household dishwasher of claim 1, wherein the control unit is configured to determine an angular speed of the rotor at which the rotor rotates due to a movement impulse of the door generated as a result of the manual movement of the door by the operator in the direction of movement, and to predetermine a drive speed of the drive motor as a function of the determined angular speed at which the door is moved further by the drive device in the direction of movement.

6. The household dishwasher of claim 1, further comprising a gear mechanism coupling the drive motor to the door such that a rotation of the rotor causes a movement of the door or a movement of the door causes a rotation of the rotor.

7. The household dishwasher of claim 6, wherein the gear mechanism is not configured to be self-locking.

8. The household dishwasher of claim 1, further comprising a drive cable coupling the drive motor to the door such that a rotation of the rotor causes a movement of the door or a movement of the door causes a rotation of the rotor.

9. The household dishwasher of claim 8, further comprising a rotatably mounted roller, said drive cable being in contact with a rotatably mounted roller, said drive motor configured to drive the roller for moving the drive cable such that the door is moved in a form of a pivoting movement as the drive motor is operated.

10. The household dishwasher of claim 9, wherein the drive cable is wound around the roller.

11. The household dishwasher of claim 9, wherein the roller and the drive cable are configured such that a drive force is transmitted from the roller to the drive cable exclusively via frictional locking.

12. A method for operating a household dishwasher, said method comprising:

mechanically coupling a rotor of a permanently excited drive motor of an electrical drive device to a door of the household dishwasher;

enabling movement of the door of the household dishwasher by the electrical drive device between a closed position, in which the door closes a loading opening of a washing container of the household dishwasher, and an open position, in which the washing container is accessible from outside;

identifying with a control unit a manual movement of the door by an operator in a direction of movement by detecting a characteristic variable of the drive device to cause the door to be moved further in the direction of movement by the drive device; and moving the door further in the direction of movement when the control unit detects an electrical voltage as the characteristic variable of the drive device, the manual movement of the door inducing the electrical voltage in the drive motor of the drive device by a movement of the rotor of the drive motor.

13. The method of claim 12, further comprising:

evaluating by the control unit an amount and/or a frequency of the electrical voltage and/or an amount of an angle of rotation of the rotor, as the door is manually moved; and operating the drive motor by taking into consideration the amount and/or the frequency of the electrical voltage and/or the amount of the angle of rotation of the rotor.

14. The method of claim 12, further comprising:

evaluating by the control unit a polarity or phase sequence of the electrical voltage, and operating the drive motor by taking into consideration the polarity or phase sequence.

* * * * *